US012056755B2

(12) United States Patent
Briggs et al.

(10) Patent No.: US 12,056,755 B2
(45) Date of Patent: *Aug. 6, 2024

(54) GEOTAGGING LOCATION DATA

(71) Applicant: Allstate Insurance Company, Northbrook, IL (US)

(72) Inventors: Ryan M. Briggs, Glen Ellyn, IL (US); Robert H. Johnson, Hoffman Estates, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,512

(22) Filed: Jul. 9, 2021

(65) Prior Publication Data
US 2021/0334883 A1 Oct. 28, 2021

Related U.S. Application Data

(63) Continuation of application No. 16/550,970, filed on Aug. 26, 2019, now Pat. No. 11,062,380, which is a (Continued)

(51) Int. Cl.
*G06Q 30/06* (2023.01)
*G06F 16/583* (2019.01)
(Continued)

(52) U.S. Cl.
CPC ....... *G06Q 30/0635* (2013.01); *G06F 16/583* (2019.01); *G06F 16/9535* (2019.01);
(Continued)

(58) Field of Classification Search
CPC ............ G06Q 30/0635; G06Q 10/0875; G06F 16/583; G06F 16/9535; G06T 7/70;
(Continued)

(56) References Cited

U.S. PATENT DOCUMENTS 8,311,858 B2  11/2012  Everett et al.
8,645,014 B1  2/2014  Kozlowski et al.
(Continued)

FOREIGN PATENT DOCUMENTS

CN    104408891 A     3/2015
JP    2017117005  *  6/2017  .............. G08G 1/00
(Continued)

OTHER PUBLICATIONS

"Allstate Mobile", Allstate Insurance Motor Club Mobile App, available for download on Google Play, downloaded from <https://play.google.com/store/apps/details?id=com.allstate.view&feature=search_result%2 . . . > on Mar. 30, 2016.
(Continued)

*Primary Examiner* — Jerome Grant, II
(74) *Attorney, Agent, or Firm* — Polsinelli PC

(57) ABSTRACT

Systems and apparatuses for capturing an image of a vehicle for which roadside assistance is being requested are provided. The image may be captured by a mobile device and the mobile device may geotag location information to the image. The image and associated geotag location information may then be processed to determine a location of the vehicle and a roadside assistance issue for which service is being requested. The image may be further analyzed to determine a context including, a make, model and/or year of the vehicle, whether special equipment is needed to service the vehicle, whether the vehicle is located in a particular situation (e.g., within a structure, in a ditch, or the like). The information obtained from the image may be used to determine a type of service to provide to the vehicle and to identify one or more service providers to dispatch to the vehicle.

18 Claims, 9 Drawing Sheets

Related U.S. Application Data continuation of application No. 15/784,485, filed on Oct. 16, 2017, now Pat. No. 10,445,817.

(51) Int. Cl.
| | |
|---|---|
| *G06F 16/9535* | (2019.01) |
| *G06Q 10/0875* | (2023.01) |
| *G06Q 30/0601* | (2023.01) |
| *G06T 7/70* | (2017.01) |
| *G06V 20/10* | (2022.01) |
| *H04W 4/02* | (2018.01) |

(52) U.S. Cl.
CPC ........... *G06Q 10/0875* (2013.01); *G06T 7/70* (2017.01); *G06V 20/10* (2022.01); *H04W 4/02* (2013.01); *G06T 2207/30252* (2013.01)

(58) Field of Classification Search
CPC .......... G06T 2207/30252; G06V 10/10; G06V 20/10; H04W 4/02
USPC ........................................................ 382/104
See application file for complete search history.

(56) References Cited

U.S. PATENT DOCUMENTS

| | | | |
|---|---|---|---|
| 8,682,348 B2 | 3/2014 | Tysowski | |
| 9,053,588 B1 | 6/2015 | Briggs et al. | |
| 9,218,626 B1 | 12/2015 | Haller, Jr. et al. | |
| 9,237,242 B2 | 1/2016 | Basir | |
| 9,462,028 B1 | 10/2016 | Levinson et al. | |
| 9,505,494 B1 | 11/2016 | Marlow et al. | |
| 9,628,975 B1 | 4/2017 | Watkins et al. | |
| 9,646,428 B1 | 5/2017 | Konrardy et al. | |
| 9,749,812 B1 | 8/2017 | Dulee et al. | |
| 9,818,239 B2 | 11/2017 | Pal et al. | |
| 10,102,586 B1 * | 10/2018 | Marlow | B64C 39/024 |
| 10,453,011 B1 * | 10/2019 | Briggs | G06Q 20/405 |
| 10,803,527 B1 * | 10/2020 | Zankat | G06V 20/59 |
| 11,062,380 B2 * | 7/2021 | Briggs | G06T 7/70 |
| 2008/0114543 A1 | 5/2008 | Vishnu | |
| 2008/0157943 A1 | 7/2008 | Rennie et al. | |
| 2011/0077990 A1 | 3/2011 | Storage | |
| 2013/0046592 A1 | 2/2013 | Ross | |
| 2013/0086109 A1 | 4/2013 | Huang | |
| 2013/0204645 A1 | 8/2013 | Lehman et al. | |
| 2013/0297352 A1 | 11/2013 | Noe et al. | |
| 2014/0229286 A1 | 8/2014 | Obradovich et al. | |
| 2014/0300743 A1 | 10/2014 | Kumon | |
| 2014/0374475 A1 | 12/2014 | Kallfelz et al. | |
| 2015/0015418 A1 | 1/2015 | Stanek et al. | |
| 2015/0052018 A1 | 2/2015 | O'Conner | |
| 2015/0062340 A1 | 3/2015 | Datta et al. | |
| 2015/0103170 A1 | 4/2015 | Nelson et al. | |
| 2015/0371456 A1 | 12/2015 | Moore, Jr. et al. | |
| 2016/0214553 A1 | 7/2016 | Benoit et al. | |
| 2016/0323741 A1 | 11/2016 | Lee et al. | |
| 2017/0228825 A1 | 8/2017 | Dhaliwal et al. | |
| 2017/0230930 A1 | 8/2017 | Frey | |
| 2017/0256171 A1 | 9/2017 | Thomas | |
| 2017/0368897 A1 | 12/2017 | Brickley et al. | |
| 2018/0152673 A1 | 5/2018 | Kim et al. | |
| 2018/0184051 A1 * | 6/2018 | Watanabe | B64C 39/024 |
| 2018/0262897 A1 | 9/2018 | Hennessy et al. | |
| 2018/0308353 A1 | 10/2018 | He et al. | |
| 2018/0357898 A1 | 12/2018 | Kamini et al. | |
| 2019/0019141 A1 | 1/2019 | Torii et al. | |
| 2019/0019167 A1 | 1/2019 | Candel et al. | |
| 2019/0090137 A1 | 3/2019 | Cutcher et al. | |
| 2019/0149974 A1 | 5/2019 | Gazdziak et al. | |

FOREIGN PATENT DOCUMENTS

| | | | | |
|---|---|---|---|---|
| KR | 20120056977 | * | 6/2012 | ............ B62D 41/00 |
| KR | 20150017510 | * | 2/2015 | ............ B62D 41/00 |
| KR | 1900778 | * | 8/2018 | ............ G06Q 10/10 |
| WO | WO2016093553 | * | 6/2016 | ........... G08B 13/196 |

OTHER PUBLICATIONS

"Geotagged photos guide army repair crews", Stephanie Giard, EE Publishers, downloaded from <http://www.ee.co.za/article/geospatial-experts-143.html> on Mar. 30, 2016.
Aug. 19, 2019—(CA) Office Action—Application No. 3,020,546.
May 28, 2020—(CA) Office Action—App. No. 3020546.
Aug. 19, 2019—(CA) Office Action—Application No. 3,020,546, 8 Pages.

* cited by examiner

GEOTAGGING LOCATION DATA

CROSS REFERENCE TO RELATED APPLICATIONS

This application is a continuation of and claims priority to U.S. application Ser. No. 16/550,970, filed Aug. 26, 2019, and entitled "Geotagging Location Data," now U.S. Pat. No. 11,062,380, which is a continuation of and claims priority to U.S. application Ser. No. 15/784,485, filed Oct. 16, 2017, entitled "Geotagging Location Data," now U.S. Pat. No. 10,445,817, all of which are incorporated herein by reference in their entirety.

FIELD OF ART

Aspects of the disclosure generally relate to arrangements for capturing images and geotagging location information to the images for use in determining a location of a vehicle and an issue associated with the vehicle

BACKGROUND

Vehicles, such as automobiles, may become disabled during a trip as a result of, for example, a vehicle malfunction, a flat tire, lack of fuel, and/or an accident. When these events occur, many drivers and/or passengers will attempt to call a tow truck company for assistance. In some cases, people do not know the name and/or telephone number of a tow truck company. In addition, some people might not be certain of their location at the time the vehicle becomes disabled. This may be especially true when people travel outside a region they usually travel. With the proliferation of smartphones (and other portable devices), many people can now look up the names and telephone numbers of tow truck companies. Still, people may have difficulty determining which tow truck company is closest to the vicinity where their vehicle is disabled or which tow truck company will be able to respond promptly. In addition, particular equipment might be needed to provide sufficient service to the vehicle. If the roadside assistance provider is not aware of the particular equipment in advance, servicing the vehicle may be delayed.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure related to systems and arrangements for capturing an image of a vehicle or portion of a vehicle for which roadside assistance is being requested. The image may be captured by a mobile device of a user and the mobile device may geotag location information to the image. The image and associated geotag location information may then be processed to determine a location of the vehicle and a roadside assistance issue for which service is being requested based on the captured image.

In some examples, the image may be further analyzed to determine a context. For instance, the image may be further analyzed to determine or identify a make, model and/or year of the vehicle, whether special equipment is needed to service the vehicle, whether the vehicle is located in a particular situation (e.g., within a structure such as a garage, in a ditch, or the like).

The information obtained from the image may be used to determine a type of service to provide to the vehicle and to identify one or more service providers to dispatch to the vehicle.

Of course, the arrangements described may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
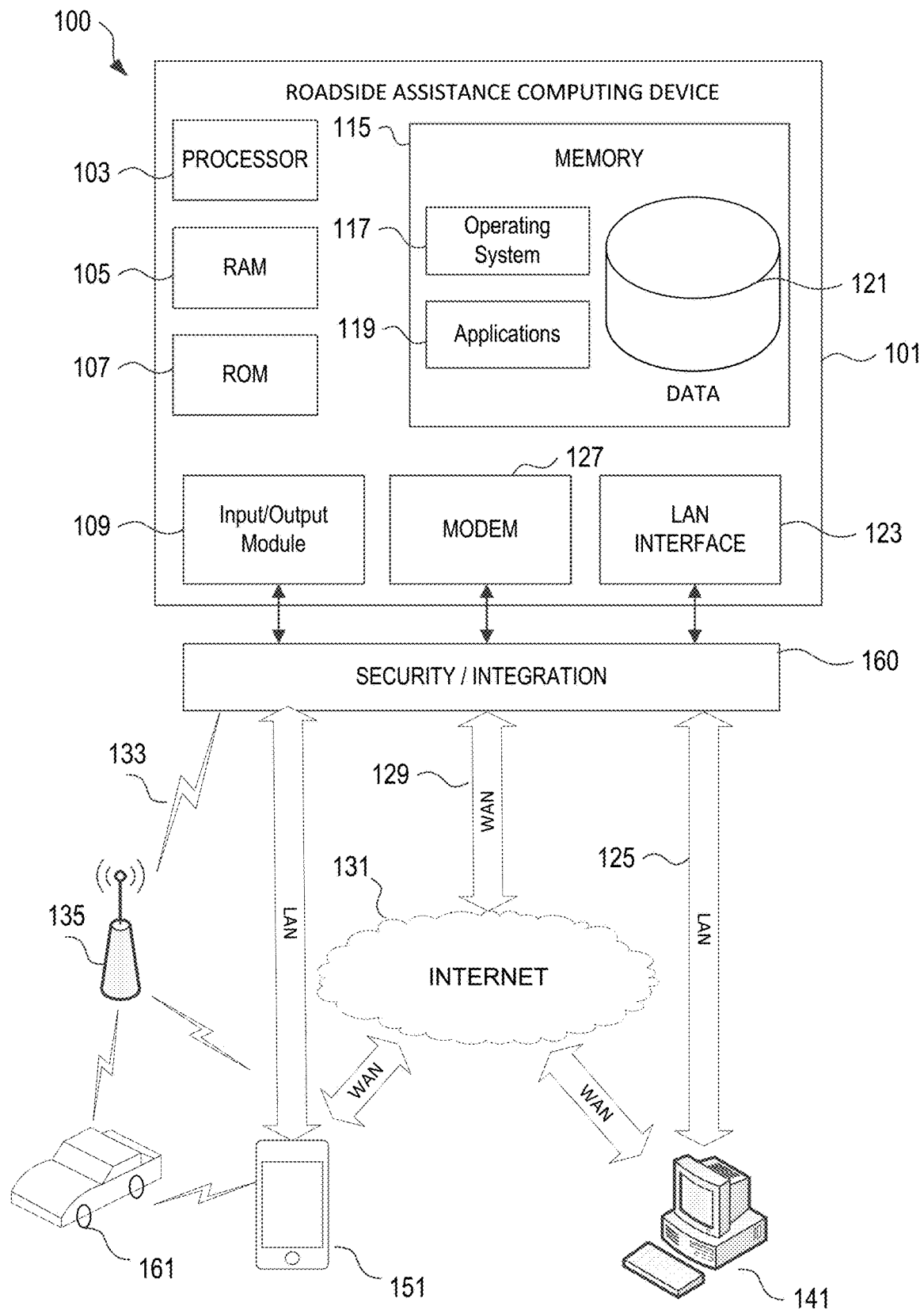
FIG. 1 illustrates one example operating environment in which one or more aspects described herein may be implemented.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to using images captured by a mobile device and geotagged location information to determine a location of a vehicle and a roadside assistance issue of the vehicle for which roadside assistance is being requested. For instance, a vehicle may become disabled along a road or highway, the vehicle might not start when a user is attempting to leave a location, or the like. Issues that may cause a vehicle to become disabled may include a flat tire, dead battery, lack of fuel, or various other causes. When the vehicle becomes disabled, the user or operator of the vehicle may request roadside assistance.

Conventional systems often require a user to identify a roadside assistance provider and contact the roadside assistance provider directly. In other example conventional arrangements, the user may phone an automobile club or other roadside assistance entity who may dispatch a roadside assistance provider. However, this may be time consuming and often requires a user to know the location of the vehicle.

As discussed more fully herein, various arrangements include a user capturing one or more images of the vehicle or portion of the vehicle for which roadside assistance is being requested. The image may be captured using the image capture device of a mobile device, or other image capture device connected to or in communication with the mobile device. In some examples, the image may be captured via a roadside assistance application executing on the mobile device. For instance, a user may access the roadside assistance application, capture an image via the application, etc.

Upon capturing the image, global positioning system (GPS) location data may be geotagged to the image. For example, the location information may be embedded in metadata associated with the image. The image and associated geotag location data may then be analyzed (either by the mobile device or another computing device) to determine a location of the vehicle and an issue associated with the vehicle for which roadside assistance is being requested (e.g., flat tire, car won't start, vehicle out of gas, or the like). In some arrangements, the location and roadside assistance issue may be determined only from the captured image and associated geotag location data (e.g., without further input from the user).

In some arrangements, the system may further analyze the image to determine or identify a context of the image or vehicle within the image. For example, the system may determine whether the vehicle is positioned on a flat surface, is in a ditch or other uneven surface, is located within a structure such as a garage. In some examples, the system may determine a make, model and/or year of the vehicle and may determine whether special equipment or processes are associated with the vehicle (e.g., whether a flat bed truck should be used, whether the lug nuts have a reverse thread, or the like).

The determined location, roadside assistance issue, and context may be used to determine a type of service to provide to the vehicle (e.g, tow to service center, change tire, provide fuel, or the like). The system may then identify one or more available roadside assistance service providers. An available service provider may then be dispatched to perform the identified service and a notification may be generated and transmitted to a user indicating an estimated wait time or estimated time of arrival of the roadside assistance provider.

These and various other arrangements will be described more fully herein.

FIG. 1 illustrates a block diagram of one example roadside assistance computing device (or system) 101 in a computer system 100 that may be used according to one or more illustrative embodiments of the disclosure. The roadside assistance computing device 101 may have a processor 103 for controlling overall operation of the device 101 and its associated components, including RAM 105, ROM 107, input/output module 109, and memory 115. The roadside assistance computing device 101, along with one or more additional devices (e.g., terminals 141 and 151, security and integration hardware 160) may correspond to any of multiple systems or devices described herein, such as personal mobile devices, vehicle-based computing devices, insurance systems servers, roadside assistance provider servers, internal data sources, external data sources and other various devices in a roadside assistance system. These various computing systems may be configured individually or in combination, as described herein, for receiving signals and/or transmissions from one or more computing devices, the signals or transmissions including an image having geotagged data indicating a location of a vehicle in need of roadside assistance, processing the signals or transmission to determine a cause of the need for roadside assistance and a location of the vehicle, and the like using the devices of the roadside assistance systems described herein. In addition to the features described above, the techniques described herein also may be used for generating and presenting an acknowledgement of the request for roadside assistance, an indication of the cause of the need for roadside assistance, an estimated time of arrival of roadside assistance, and the like, or the like, to users (e.g., via a computing device, such as an on-board vehicle computing device, mobile device, or the like).

Input/Output (I/O) 109 may include a microphone, keypad, touch screen, and/or stylus through which a user of the roadside assistance computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within roadside assistance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, roadside assistance server 101, etc.), in order to receive and analyze the signals, transmissions, etc. including images having geotagged location information, determine a location of the vehicle based on the geotagged location information, determine a cause of the need for roadside assistance based on a received image, identify a roadside assistance provider to assist the vehicle, and/or determine an estimated time of arrival of the roadside assistance vehicle using the various devices of the roadside assistance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, receive signals or transmissions including images having geotagged location information, determine a location of the vehicle based on the geotagged location information, determine a cause of the need for roadside assistance based on the signals or transmissions, and the like.

The computing device (e.g., a personal mobile device, vehicle-based system, insurance system server, roadside assistance server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the road segment evaluation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a roadside assistance server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, vehicle and driver data retrieval and analysis, location identification, roadside assistance issue identification, and the like. In other examples, the security and integration layer 160 may correspond to separate hardware and software components which may be operated at a separate physical location and/or by a separate entity.

As discussed below, the data transferred to and from various devices in a roadside assistance system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, roadside assistance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, location data, roadside assistance issue data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, road segment sensor data, and/or driving trip data analysis web service, a road segment evaluation web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, database of roadside assistance issue information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein may be configured to communicate using any of these network protocols or technologies.

Additionally, one or more application programs 119 may be used by the various computing devices 101 within a roadside assistance system 100 (e.g., vehicle data, driver data, location data, roadside assistance issue data, and/or roadside assistance analysis software applications, image analysis software applications, etc.), including computer executable instructions for receiving and analyzing various signals or transmissions including images having geotagged location information, determining a location of a vehicle from the geotagged location information, determining a cause of the need for roadside assistance from the received image or images, identifying a roadside assistance provider and determining an estimated time of arrival of the roadside assistance provider, and the like.

Figure 2:
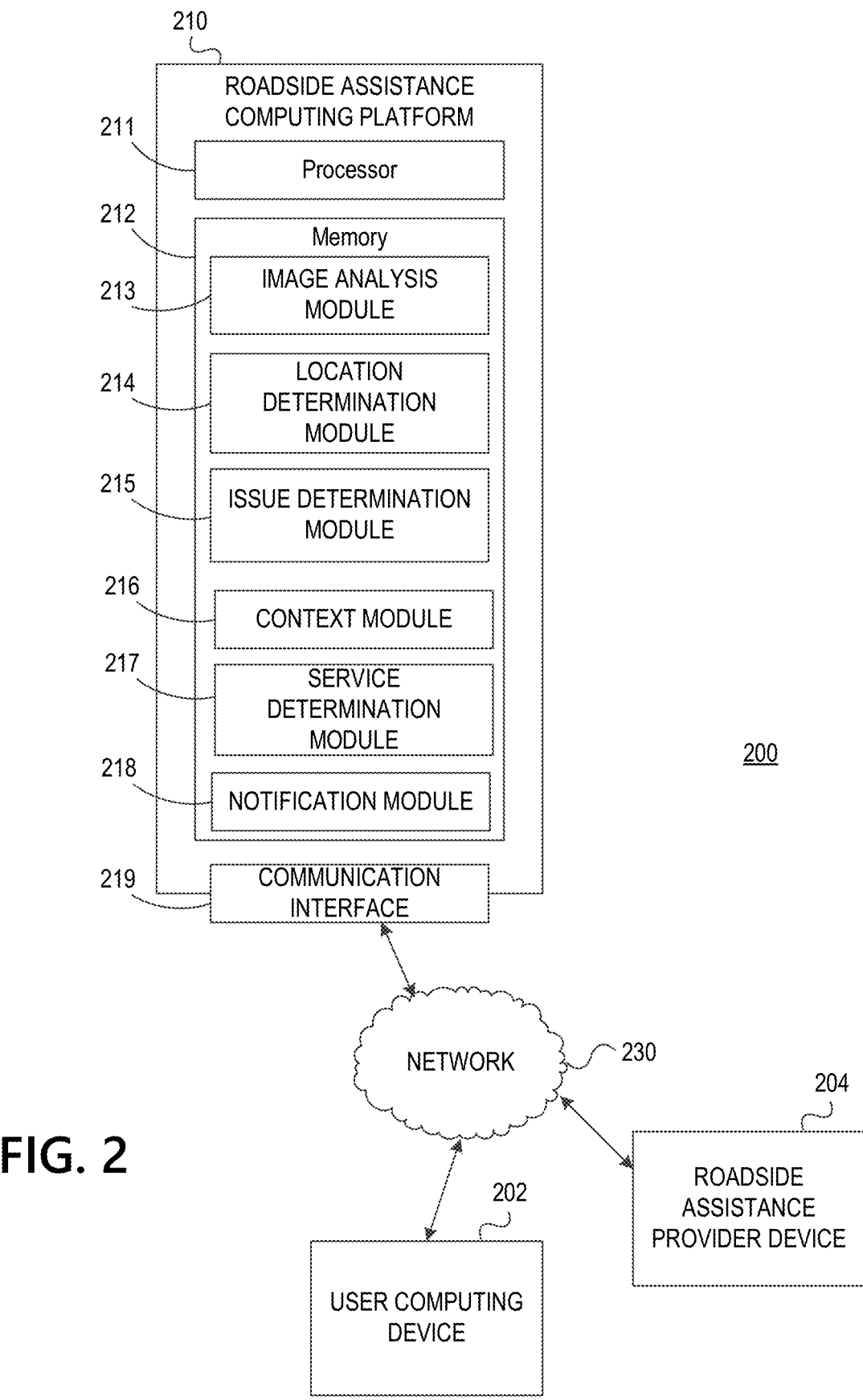
FIG. 2 illustrates one example roadside assistance system in accordance with one or more aspects described herein.

FIG. 2 depicts an environment 200 including an illustrative computing platform for receiving a roadside assistance request in the form of an image with geotagged data, determining a location of a vehicle in need of roadside assistance, determining a roadside assistance issue associated with the vehicle, and providing roadside assistance, according to one or more aspects described herein. For instance, the environment 200 includes a roadside assistance computing platform 210, which may include one or more processors 211, memory 212, and communication interface 219. A data bus may interconnect processor(s) 211, memory 212, and communication interface 219. Communication interface 219 may be a network interface configured to support communication between roadside assistance computing platform 210 and one or more networks (e.g., network 230). One or more computing destinations 204 may be in communication with the roadside assistance computing platform 210 (e.g., via network 230). Memory 212 may include one or more program modules having instructions that when executed by processor(s) 111 cause roadside assistance computing platform 210 to perform one or more functions described herein and/or one or more databases that may store and/or otherwise maintain information which may be used by such program modules and/or processor(s) 211. In some instances, the one or more program modules and/or databases may be stored by and/or maintained in different memory units of roadside assistance computing platform 210 and/or by different computer systems that may form and/or otherwise make up the roadside assistance computing platform 210. In some arrangements, different features or processes performed may be performed by different sets of instructions, such that the processor may execute each desired set of instructions to perform different functions described herein.

For example, memory 212 may include an image analysis module 213. The image analysis module 213 may include hardware and/or software configured to perform various functions within the roadside assistance computing platform 210. For instance, the image analysis module 213 may receive one or more images from a user device, such as user computing device 202. The user computing device 202 may be a mobile device, such as a smart phone, cell phone, tablet computing device, laptop computing device, or the like, having image capture capabilities (e.g., a built-in camera, connectivity to a device having a camera, etc.). The user computing device 202 may further include global positioning system (GPS) capabilities that may identify a location of the user computing device 202. In some examples, the GPS system may be located in a vehicle (e.g., the vehicle for which the user is requesting roadside assistance) and the GPS data (e.g., coordinates, bearing, altitude, etc.) may be provided to the user computing device 202 from the vehicle.

In some arrangements, the geotag information (e.g., latitude and longitude, etc.) may be embedded in metadata associated with the image being captured. The geotag information may be based on GPS information captured at the time the image was captured. The geotag information may be stored in various suitable formats, such as Exchangeable image file format (Exif) or Extensible Metadata Platform (XMP) format. Accordingly the geotag data might not be visible on the image being captured but may be embedded within the metadata of the image and read using various programs.

Accordingly, upon a user needing or desiring to request roadside assistance for a vehicle, am image of the vehicle (or portion of the vehicle) may be captured by the user computing device 202, geotag location data may be embedded in the metadata, and the image may be transmitted (e.g., via network 230 which may be a cellular network, the Internet, etc.) to the roadside assistance computing platform 210. The image and associated geotag data may be analyzed by the image analysis module 213 to determine a location of the vehicle (based on the geotagged location information) as well as a cause of the request for roadside assistance.

For example, the user may capture an image of a portion of the vehicle for which roadside assistance is being requested. For instance, if a vehicle has a flat tire, the user may capture an image of the flat tire. In another example, if the car is out of fuel, the user may capture an image of the fuel gauge. In yet another example, if the car has stopped running and one or more indicator lights are illuminated on the dashboard, the user may capture an image of the dashboard. The captured image may be transmitted to the image analysis module 213 for analysis of the image and embedded data. In another example, the user may capture an image of the dashboard having one or more indicator lights illuminated. The captured image may be transmitted to the image analysis module 213 for analysis.

In some examples, the image analysis module 213 may evaluate or analyze the one or more captured images to determine whether minimum quality criteria are met. For instance, if the image is blurred or does not fully capture the portion of the vehicle for which assistance is being requested, the image analysis module 213 may deem the pictures insufficient to make a determination. Accordingly, additional images may be requested, a notification may be transmitted to the user, and/or a roadside assistance provider may be dispatched to a determined location of the vehicle (if geotag information is sufficient to determine the location.

The roadside assistance computing platform 210 may further include a location determination module 214. The location determination module 214 may include hardware and/or software configured to perform various functions within the roadside assistance computing platform 210. For instance, the location determination module 214 may receive results of analysis performed by the image analysis module 213 and may determine a location of the vehicle for which roadside assistance is being requested. The location may be determined from the geotag data embedded within the received image metadata and may include a longitude and latitude of the vehicle's current location.

The roadside assistance computing platform 210 may further include a roadside assistance issue determination module 215. The roadside assistance issue determination module 215 may include hardware and/or software configured to perform particular functions within the roadside assistance computing platform. For instance, the roadside assistance issue determination module 215 may receive results of the image analysis performed by the image analysis module 213 and may identify, based on the results and the image a roadside assistance issue associated with the vehicle. For instance, the roadside assistance issue may be a problem with the vehicle that has necessitated the request for roadside assistance (e.g., flat tire, out of fuel, car won't start, dead battery, etc.). In some examples, shape or pattern recognition may be used to determine the roadside assistance issue.

The roadside assistance computing platform 210 may further include a context module 216. The context module 216 may include hardware and/or software configured to perform particular functions within the roadside assistance computing platform 210. For instance, the context module 216 may analyze a context of the image (e.g., background, other portions of a vehicle that are visible in the image, etc.) to identify any special or particular equipment that may be needed to address the roadside assistance issue. For example, if the image includes a flat tire but the image also shows that the vehicle is located in a ditch, the vehicle may need to be towed or removed from the ditch prior to addressing the flat tire. Accordingly, any special towing needs may be accounted for in identifying a roadside assistance service provider.

In another example, if a vehicle won't start and the image depicts the vehicle in a garage or other structure, the system may determine that high profile roadside assistance vehicles might not be able to access the vehicle and may account for this when identifying a roadside assistance provider.

The roadside assistance computing platform 210 may further include a service determination module 217. The service determination module 217 may include hardware and/or software configured to perform particular functions within the roadside assistance computing platform 210. For instance, the service determination module 217 may receive the identified roadside assistance issue, context, location, and the like, and may identify a type of service to provide for the vehicle (e.g., change flat tire, provide fuel, tow, etc.). The service determination module 217 may then identify one or more roadside assistance service providers that are available, are near to the determined location, have any necessary special equipment to perform the service, and the like. A request for roadside assistance may then be transmitted to one or more of the identified roadside assistance service providers, such as to a roadside assistance provider computing device 204. As will be discussed more fully herein, the roadside assistance service provider may accept the request and may provide an estimated time of arrival. Alternatively, the service determination module 217 may determine an estimated time of arrival (e.g., based on information associated with location of the vehicle, location of the service provider, real-time availability information of the service provider, etc.). Some or all of this information may be received from one or more databases.

The roadside assistance computing platform 210 may further include a notification module 218. The notification module may include hardware and/or software configured to perform particular functions within the roadside assistance computing platform 210. For instance, the notification module 218 may generate one or more notifications indicating an acknowledgement of the request for roadside assistance, identification of the roadside assistance issue and/or an estimated time of arrival. The notification may be transmitted to the user computing device 202 and the notification module 218 may display the notification or cause (e.g., transmit a signal causing) the notification to be displayed on the user computing device 202.

Although the various modules of the roadside assistance computing platform 210 are described separately, functionality of the various modules may be combined and/or may be performed by a single device or multiple computing devices in communication without departing from the invention.

Figure 3:
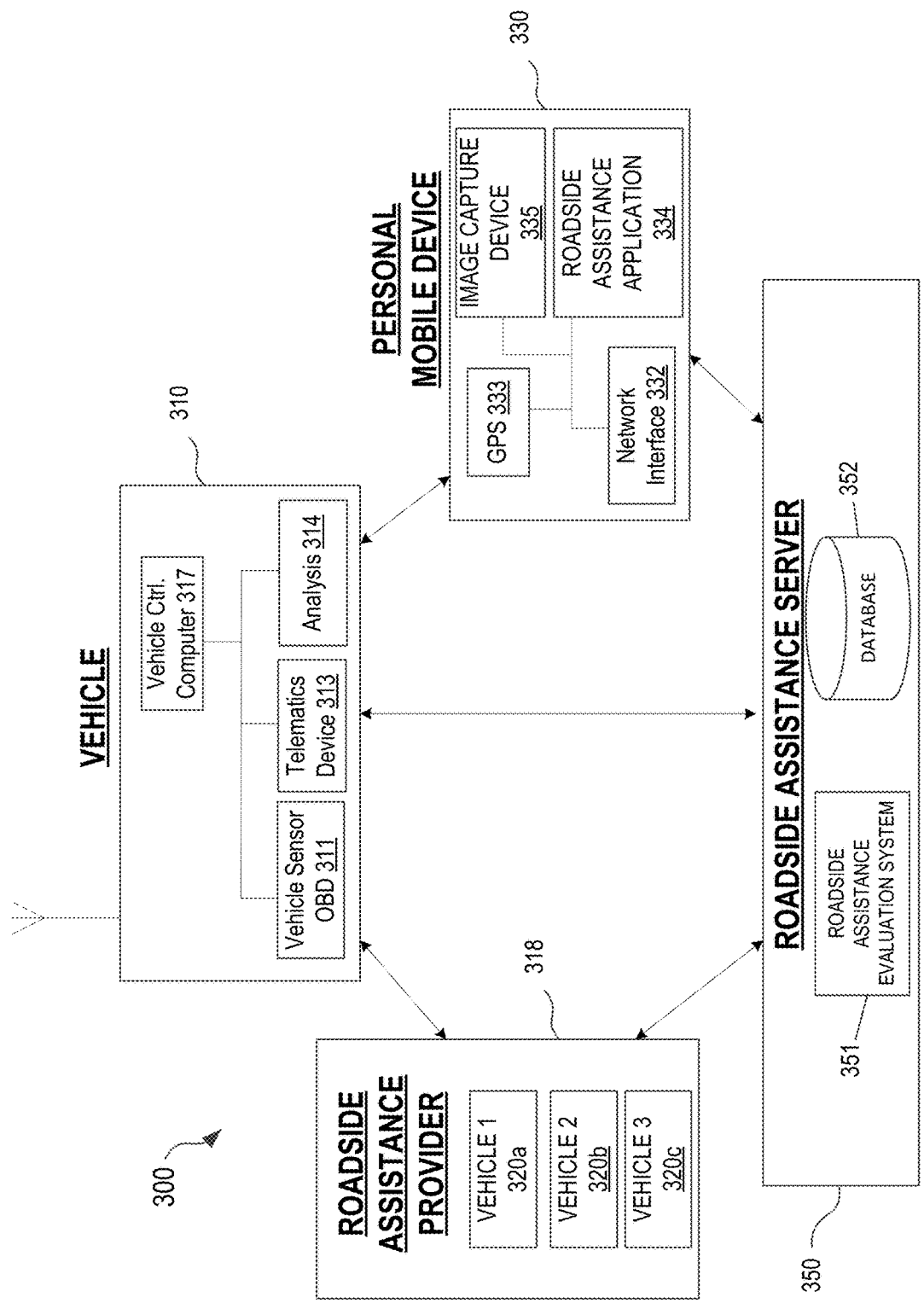
FIG. 3 is another example roadside assistance system in accordance with one or more aspects described herein.

FIG. 3 is a diagram of an illustrative roadside assistance system including additional aspects not shown in the roadside assistance system 200 of FIG. 2 and/or implementing the roadside assistance system 200 of FIG. 2. The system 300 includes a vehicle 310, a personal mobile device 330, a roadside assistance server 350, a roadside assistance provider device 318, and additional related components. As discussed below, the components of the system 300, individually or using communication and collaborative interaction, may capture one or more images including geotagged data of a vehicle for which roadside assistance is being requested, transmit and analyze the images to determine a location of the vehicle and a roadside assistance issue of the vehicle, evaluate a context of the image, identify a service to provide, identify one or more roadside assistance service providers, and the like. To perform such functions, the components shown in FIG. 3 each may be implemented in hardware, software, or a combination of the two. Additionally, each component of the system 300 may include a computing device (or system) having some or all of the structural components described above for computing device 101.

Vehicle 310 in the system 300 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and/or analyzed. The vehicle 310 includes vehicle operation sensor 311 (similar to one or more of sensors 216a-216b of FIG. 2) capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a driving data/behavior analysis. Sensor 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicles sensor 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensor 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 may be stored and/or analyzed within the vehicle 310, such as for example by a driving analysis computer 314 integrated into the vehicle, and/or may be transmitted to one or more external devices. For example, as shown in FIG. 3, sensor data may be transmitted via a telematics device 313 to one or more remote computing devices, such as personal mobile device 330, roadside assistance server 350, and/or other remote devices.

As shown in FIG. 3, the data collected by vehicle sensor 311 may be transmitted to roadside assistance server 350, personal mobile device 330, and/or additional external servers and devices via telematics device 313. Telematics device 313 may be one or more computing devices containing many or all of the hardware/software components as the computing device 101 depicted in FIG. 1. As discussed above, the telematics device 313 may receive vehicle operation data and driving data from vehicle sensor 311, and may transmit the data to one or more external computer systems (e.g., roadside assistance server 350 of an insurance provider, financial institution, or other entity) over a wireless transmission network. Telematics device 313 also may be configured to detect or determine additional types of data relating to real-time driving and the condition of the vehicle 310. The telematics device 313 also may store the type of vehicle 310, for example, the make, model, trim (or submodel), year, and/or engine specifications, as well as other information such as vehicle owner or driver information, insurance information, and financing information for the vehicle 310.

In the example shown in FIG. 3, telematics device 313 may receive vehicle driving data from vehicle sensor 311, and may transmit the data to a road segment evaluation server 350. However, in other examples, one or more of the vehicle sensors 311 or systems may be configured to receive and transmit data directly from or to a roadside assistance server 350 without using a telematics device. For instance, telematics device 313 may be configured to receive and transmit data from certain vehicle sensors 311 or systems, while other sensors or systems may be configured to directly receive and/or transmit data to a roadside assistance server 350 without using the telematics device 313. Thus, telematics device 313 may be optional in certain embodiments.

In some examples, telematics, sensor data, and/or other data (e.g., error or issue codes associated with maintenance of a vehicle) may be transmitted (e.g., to roadside assistance server) and may be used to further aid in determining a roadside assistance issue associated with the vehicle.

The system 300 in FIG. 3 also includes a mobile device 330. Mobile device 330 may be, for example, a smartphone or other mobile phone, personal digital assistant (PDAs), tablet computer, and the like, and may include some or all of the elements described above with respect to the computing device 101. As shown in this example, some mobile devices in systems 300 (e.g., mobile device 330) may be configured to establish communication sessions with vehicle-based devices and various internal components of vehicle 310 via wireless networks or wired connections (e.g., for docked devices), whereby such mobile devices 330 may have secure access to internal vehicle sensors 311 and other vehicle-based systems. However, in other examples, the mobile device 330 might not connect to vehicle-based computing devices and internal components, but may operate independently by communicating with vehicle 310 via their standard communication interfaces (e.g., telematics device 313, etc.), or might not connect at all to vehicle 310.

Mobile device 330 may include a network interface 321, which may include various network interface hardware (e.g., adapters, modems, wireless transceivers, etc.) and software components to enable mobile device 330 to communicate with roadside assistance server 350, vehicle 310, and various other external computing devices. One or more specialized software applications, such as a roadside assistance application 334 may be stored in the memory of the mobile device 330. The roadside assistance application 334 may be received (e.g., downloaded or otherwise provided) via network interface 321 from the roadside assistance server 350, vehicle 310, or other application providers (e.g., application stores). As discussed below, the roadside assistance application 334 may or may not include various user interface screens, and may be configured to run as user-initiated applications or as background applications. The memory of the mobile device 330 also may include databases configured to receive and store vehicle data, driving data, driving trip data, and the like, associated with one or more drivers, vehicles, and/or road segments.

Mobile device 330 may include various components configured to generate and/or receive vehicle data, driver data, and driving data or other operational data, as well as communicate with other devices within the system 300. Further, the mobile device may include an image capture device 335 which may be used to capture images of a vehicle in need of roadside assistance, a portion of the vehicle (e.g., tire area, dashboard, fuel gauge, position of the vehicle, etc.), surroundings of the vehicle, and the like. Using data from the GPS receiver 333, the mobile device 330 (e.g., via a roadside assistance software application 334 operating and/or executing on the mobile device) may attach or embed (e.g., in metadata) geotag location data to one or more captured images of the vehicle. Additional components of mobile device 330 may be used to generate or receive data for the roadside assistance application 334, such as an accelerometer, compass, and various proximity sensors. As discussed herein, the roadside assistance software application 334 may store and analyze the data from various mobile device components, historical data, and the like, and may use this data, in conjunction with one or more other devices (e.g., roadside assistance server 350), identify a location of a vehicle, an issue associated with the vehicle, a roadside assistance provider, and the like.

Mobile computing device 330 may store, analyze, and/or transmit the data (such as images and/or image data, associated metadata, geotag location data, etc.) to one or more other devices. For example, mobile computing device 330 may transmit data directly to one or more roadside assistance servers 350. As discussed above, the roadside assistance server may analyze images captured by the mobile device, determine a location of the vehicle for which assistance is being requested, determine a roadside assistance issue for which service is being requested, identify a service to provide, evaluate a context of the images, and/or identify one or more potential service providers. In some examples, one or more of these functions may be performed by the processing components of the mobile device (e.g., via roadside assistance application 334). Therefore, in certain arrangements, mobile computing device 330 may be used in conjunction with, or in place of, the roadside assistance server 350.

As discussed above, images may be captured by the image capture device 335 of the mobile device 330 and processed or transmitted via to, for instance, roadside assistance server 350 for analysis. In some examples, the images may be transmitted via the roadside assistance application 334 executing on the mobile device. Additionally or alternatively, the images may be transmitted via other means (e.g., via an on-line application executing at the roadside assistance server 350, via short message system (SMS), e-mail, or other electronic transmissions). Accordingly, in some arrangements, a user may access the roadside assistance service regardless of whether the user has downloaded or installed the roadside assistance application 334 on the mobile device 330.

Vehicle 310 may include driving analysis computer 314, which may be separate computing devices or may be integrated into one or more other components within the vehicle 310, such as the telematics device 313, autonomous driving systems, or the internal computing systems of vehicle 310. As discussed above, driving analysis computers 314 also may be implemented by computing devices independent from the vehicle 310, such as mobile computing device 330 of the drivers or passengers, or one or more separate computer systems (e.g., a user's home or office computer). In any of these examples, the driving analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, may be performed in a central road segment evaluation server 350 rather than by the individual vehicle 310 or personal mobile device 330. In such implementations, the vehicle 310 and and/or mobile device 330, might only collect and transmit driver data, sensor data, image data, and the like to roadside assistance server 350, and thus the vehicle-based driving/analysis computer 314 may be optional.

The system 300 also may include one or more roadside assistance servers 350, containing some or all of the hardware/software components as the computing device 101 depicted in FIG. 1. The roadside assistance server 350 may include hardware, software, and network components to receive at least images and/or image data, geotag location data, and the like, from one or more vehicles 310, mobile devices 330, and other data sources. The roadside assistance server 350 may include a roadside assistance database 352 and roadside assistance evaluation system 351 to respectively store and analyze driver data, vehicle data, sensor data, and image data, etc., received from vehicle 310, mobile device 330, and/or other data sources. In some examples, the roadside assistance evaluation system 351 may include many or all of the components of the roadside assistance computing platform 210 described with respect to FIG. 2.

The roadside assistance server 350 may initiate communication with and/or retrieve at least image data (and associated metadata, geotag location data, etc.) from mobile device 330, or by way of separate computing systems over one or more computer networks (e.g., the Internet). In some examples, some data may be received from vehicle 310 wirelessly via telematics device 313. Additionally, the roadside assistance server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., coverage amount, deductible amount, premium amount, insured status) for the vehicle, driver, and/or other nearby vehicles and drivers, real-time availability data from one or more roadside assistance providers, and the like.

Data stored in the roadside assistance database 352 may be organized in any of several different manners. For example, a roadside assistance table may contain data related to previous roadside assistance issues, vehicle features (e.g., organized by make, model, year, etc.), special equipment needs for particular vehicles, images of roadside assistance issues, etc. Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The roadside assistance evaluation system 351 within the roadside assistance server 350 may be configured to retrieve data from the database 352, or may receive data (e.g., image data, geotag data, etc.) directly from mobile device 330, or other data sources, and may perform one or more analyses to evaluate the image received, identify a location of the vehicle and issue of the vehicle for which assistance is requested, evaluate a context of the received image(s), identify one or more services to provide to the vehicle, identify one or more potential service providers, and other related functions. For instance, in some arrangements, the received images may be compared to pre-stored images (e.g., obtained from roadside assistance database 352) to identify the roadside assistance issue for which assistance is requested. For example, an image received may be compared to previously stored images until a match is found. The functions performed by the roadside assistance evaluation system 351 may be performed by specialized hardware and/or software separate from the additional functionality of the roadside assistance server 350. Such functions and further descriptions and examples of the algorithms, functions, and analyses that may be executed by the roadside assistance evaluation system 351 are described herein.

In various examples, the roadside assistance analyses, identifications and determinations may be performed entirely in the roadside assistance server 350, may be performed entirely in the vehicle-based driving analysis computing module 314, or may be performed entirely in the roadside assistance application 334 of mobile device 330. In other examples, certain analyses of image data, and the like, may be performed by vehicle-based devices (e.g., within driving analysis device 314) or mobile device 330 (e.g., within application 334), while other data analyses are performed by the roadside assistance evaluation system 351 at the roadside assistance server 350. Various other combinations of devices processing data may be used without departing from the invention.

System 300 may further include a roadside assistance provider device 318. The roadside assistance provider device 318 may include one or more computing devices (e.g., servers, personal computing devices, mobile computing devices, and the like) that may be in communication with (e.g., via one or more networks) one or more other devices within the system 300 (e.g., roadside assistance server 350, etc.). The roadside assistance provider device 318 may be configured to receive a request for service from, for instance, the roadside assistance server 350, and may accept or decline the request. In some examples, acceptance of a request may include determining or identifying an estimated time of arrival at the determined location of the vehicle for which assistance is requested. Acceptance and/or the estimated time of arrival may be transmitted to the roadside assistance server 350 or, in some arrangements, to the mobile device 330. The roadside assistance provider device 318 may then dispatch one or more roadside assistance provider vehicles 320a-320c to the determined location.

Figure 4A:
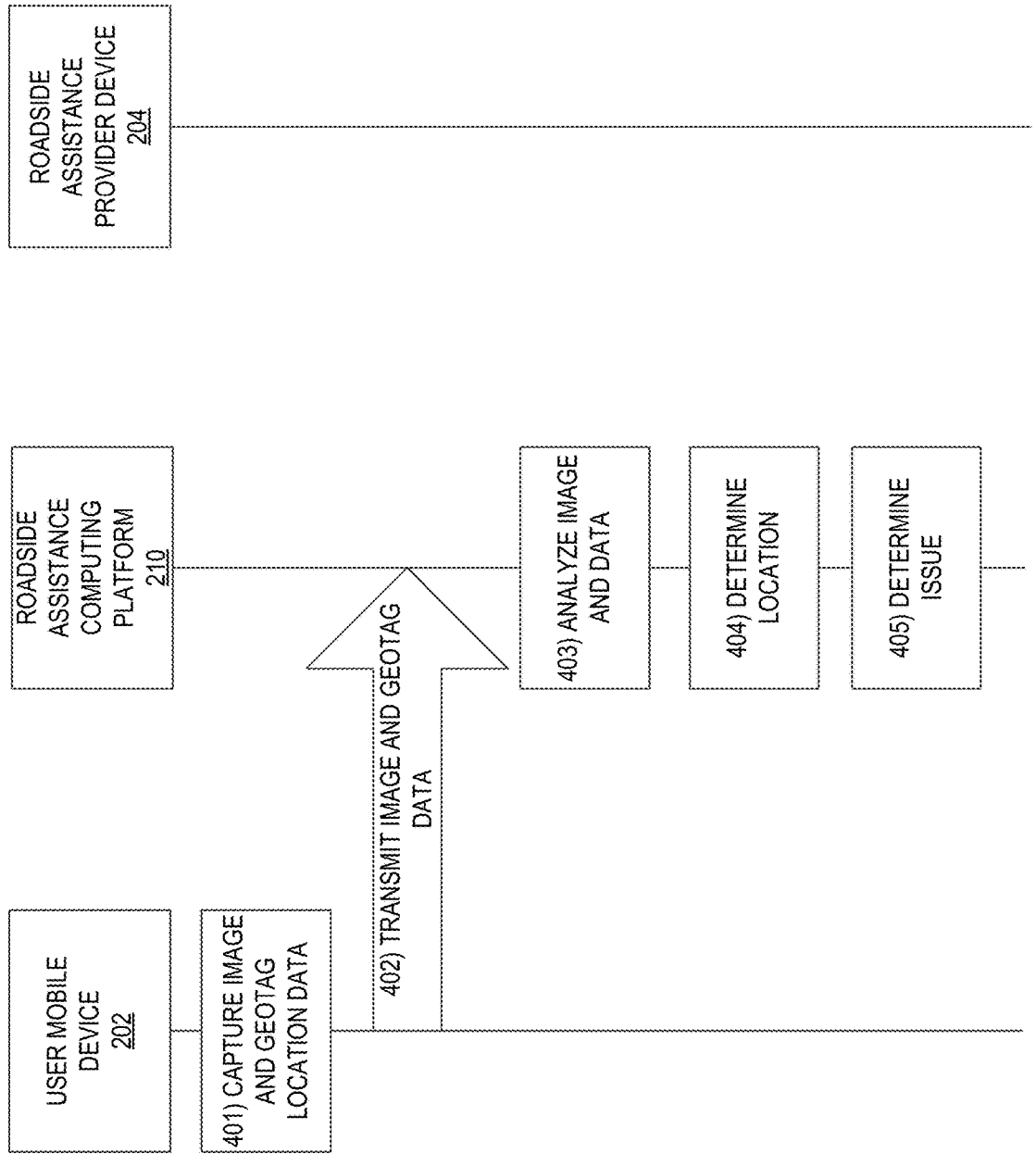
FIGS. 4A-4C illustrate one example event sequence in accordance with one or more aspects described herein.
Figure 4B:
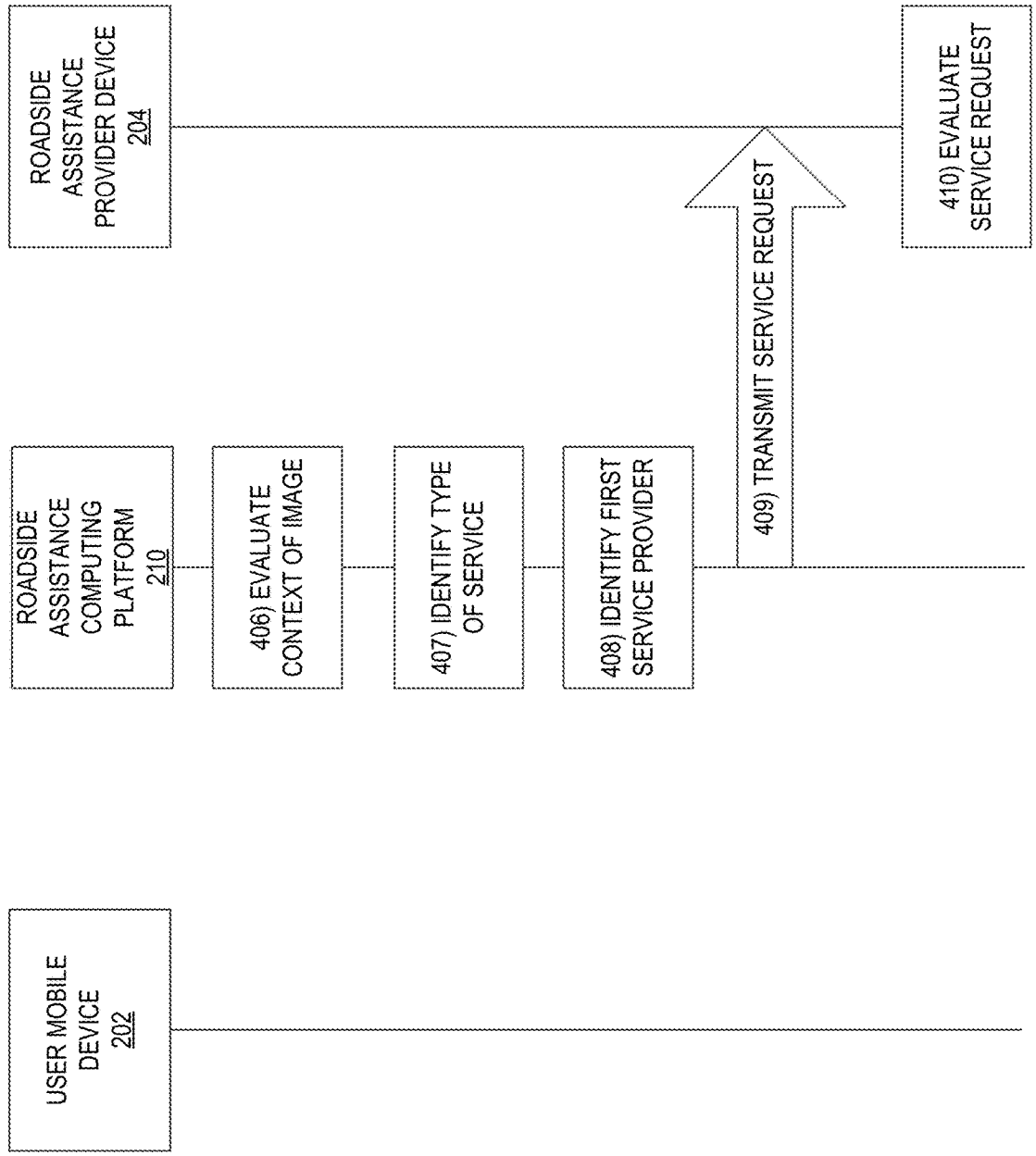
Figure 4C:
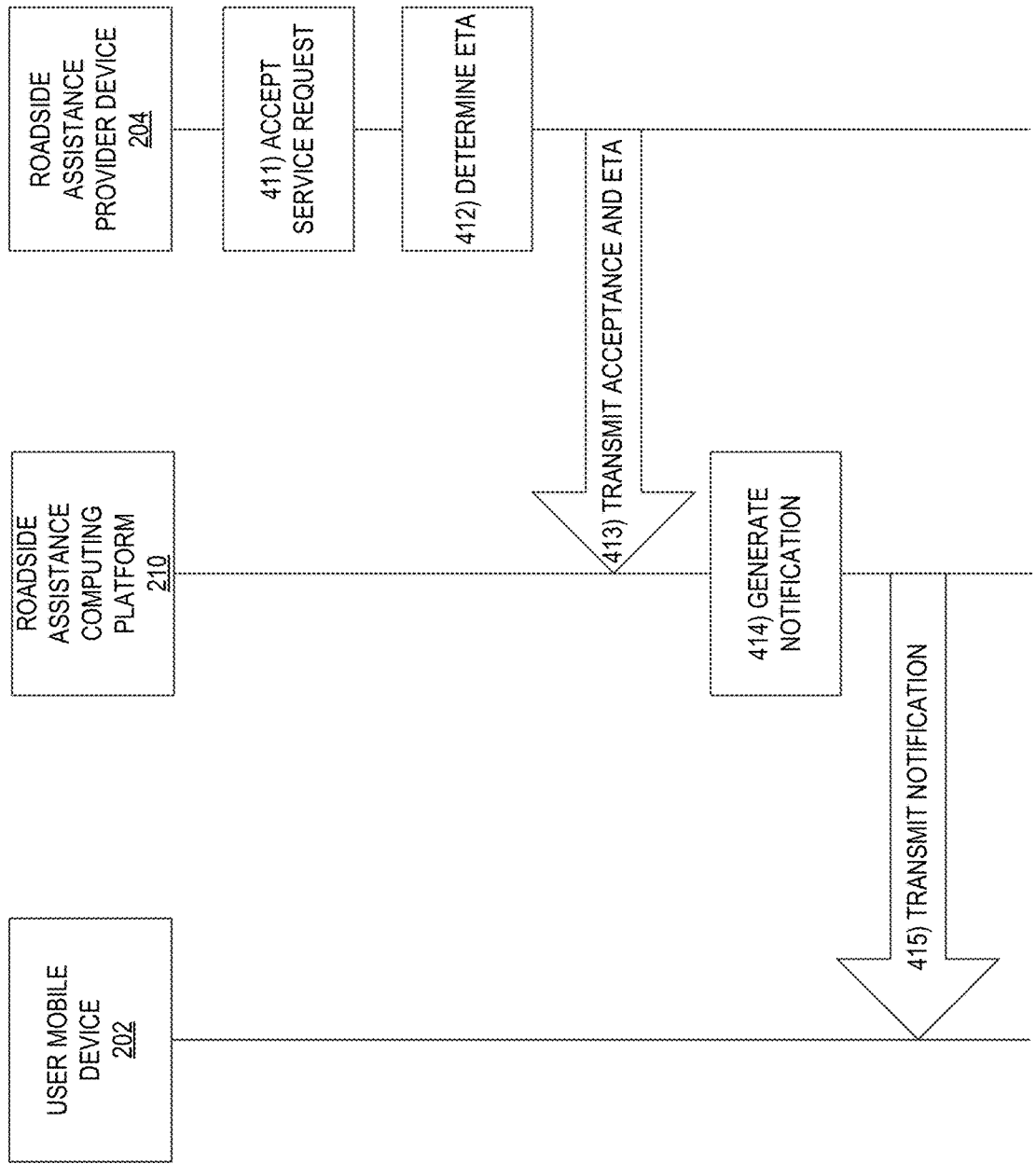

FIGS. 4A-4C illustrate one example event sequence for capturing and receiving images and/or image data to determine a location of a vehicle for which service is requested and a type of service to provide to the vehicle. The sequence illustrated in FIGS. 4A-4C is merely one example sequence and various other events may be included, or events shown may be omitted, without departing from the invention.

With reference to FIG. 4A, in step 401, an image and associated geotag data may be captured. As discussed above, an image capture device of a user computing device 202, such as a mobile device of the user, may be used to capture one or more images of the vehicle or portion of the vehicle for which service is being requested. GPS data from a GPS system associated with the user computing device 202 may be used to embed geotag location information in metadata associated with the image. In step 402, the captured image(s) and geotag location information may be transmitted to a roadside assistance computing platform 210.

In step 403, the roadside assistance computing platform 210 may analyze the received image and geotag data and, in step 404, may determine a location of the vehicle for which service is being requested based on the received image and associated geotag location information (e.g., geotag data may be read but one or more software applications). In step 405, a roadside assistance issue for which service is being requested may be determined. In some examples, determination or identification of the roadside assistance issue may be performed by comparing the received image to pre-stored images of various roadside assistance issues to identify the current issue. For instance, pattern and/or shape recognition may be used to determine a nature of the issue, a portion of the vehicle affected (e.g., right front tire, left rear tire, etc.) and the like.

With reference to FIG. 4B, in step 406, a context of the received image may be evaluated. For instance, the surroundings of the vehicle, position of the vehicle, make, model and year of vehicle, and the like, may be identified from the received image. Issues such as a vehicle being in a ditch, a side of the road on which the vehicle is positioned, a direction in which the vehicle is facing, whether the vehicle is in a garage or other structure, whether the vehicle has after-market modifications (e.g., lift kit, etc.) may be identified from the image and may be used to determine whether any special equipment (e.g., low profile service vehicle, flat-bed vs. traditional tow truck, etc.) may be needed for the service.

In step 407, a type of service to provide may be identified or determined from the identified issue, evaluated context, determined location, etc. For instance, if a vehicle is out of fuel, the system may determine, at step 407, that a roadside assistance provider vehicle should be dispatched to bring fuel to the vehicle. In step 408, a first service provider may be identified. Identifying the first service provider may be based on the determined type of service to provide, whether any special equipment is needed to perform the service, availability of the service provider (e.g., based on real-time or near real-time availability data) and the like.

In step 409, a request for service may be transmitted to a device 204 of the first identified service provider. In step 410, the service request may be evaluated by the first service provider.

With reference to FIG. 4C, the first identified service provide may accept the request for roadside assistance in step 411 and may determine an estimated time of arrival in step 412. In step 413, the acceptance and estimated time of arrival may be transmitted to the roadside assistance computing platform 210 and in step 414 the roadside assistance computing platform 210 may generate a notification to provide to the user. The notification may include items such as, an acknowledgement of the request for service, an indication of the identified issue, an indication of the determined location of the vehicle, a name of a service provider being dispatched, an estimated time of arrival of the service provider, and the like.

In step 415, the notification may be transmitted to the user computing device 202 and may be displayed (or the roadside assistance computing platform 210 may cause to be displayed on the user computing device 202) the transmitted notification.

Figure 5:
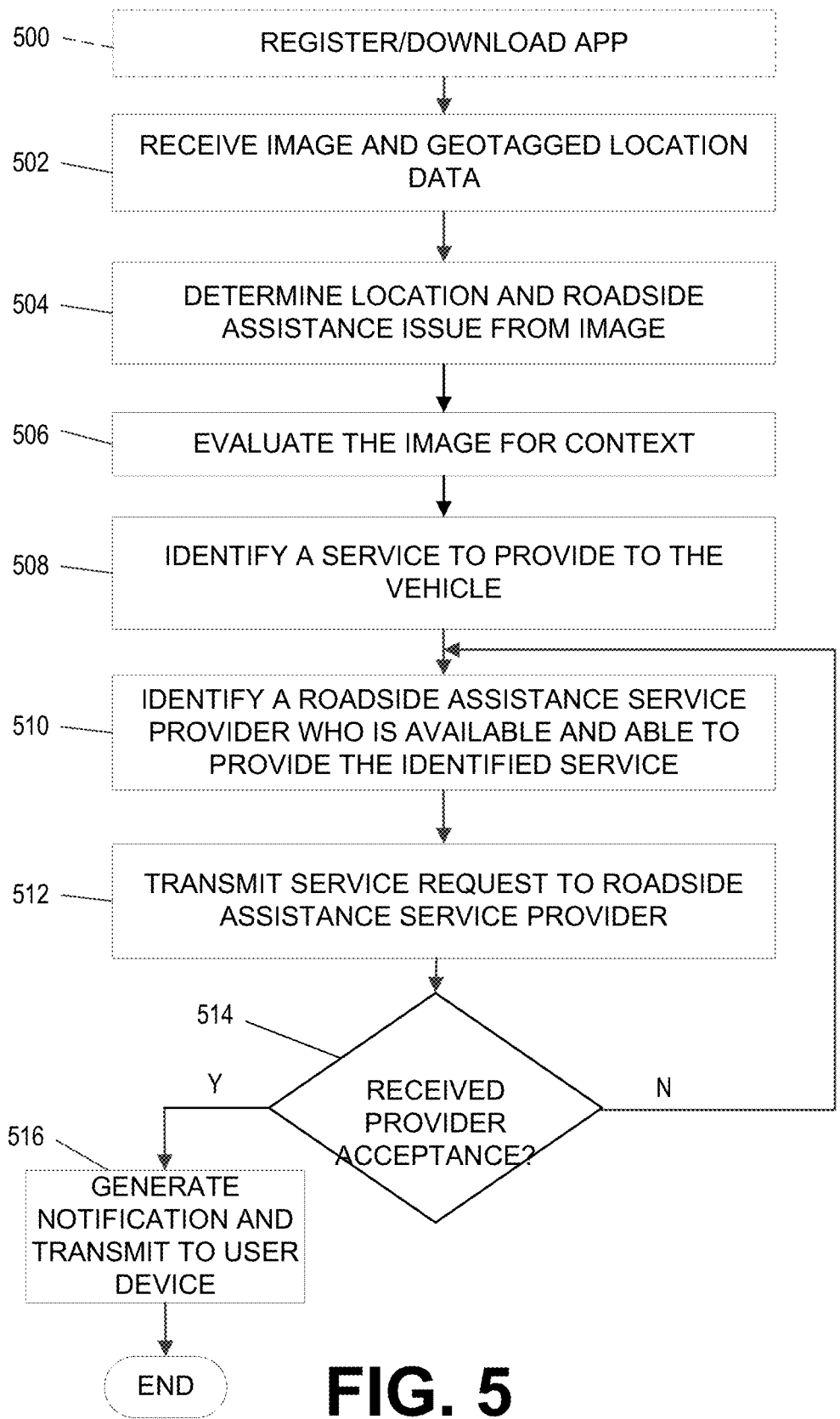
FIG. 5 illustrates one example method of determining a location of a vehicle for which roadside assistance is requested and a roadside assistance issue of the vehicle, and identifying a roadside assistance provider in accordance with one or more aspects described herein.

FIG. 5 illustrates a flow chart illustrating one example method of requesting roadside assistance using one or more arrangements discussed herein. In optional step 500, a user may register with a roadside assistance provider system and/or may download a roadside assistance application (e.g., roadside assistance application 334) to a user computing device, such as a mobile device. Registering with the system may include providing information associated with the user, such as name, phone number or other contact information, payment information (e.g., credit card number), auto club membership information, vehicle information, and the like. Similarly, when the application is downloaded to the mobile device, in some arrangements, the user may input name, contact information and/or payment information, to aid in streamlining the roadside assistance request process.

In step 502, the user may capture an image of the vehicle or portion of the vehicle for which roadside assistance is being requested and the image may include geotag location information. The image and associated data may be captured using, for instance, the roadside assistance application executing on the user's mobile device, as well as the image capture device of the mobile device and GPS of the mobile device. This image and associated data may be transmitted to and/or received by a system for performing further analysis on the image. For instance, the image and associated data may be received by a roadside assistance server or computing platform configured to analyze the image and data. In some examples, the analysis may be performed by the roadside assistance application on the mobile device.

In step 504, a location of the vehicle in need of assistance, as well as a roadside assistance issue for which assistance is being requested may be determined from the image and associated data. In some examples, shape and/or pattern recognition may be used to identify the issue. In some arrangements, the image may be compared to pre-stored images to identify an issue (e.g., comparison to multiple images of issues until a match is found, or the like). In still other examples, a user may identify (e.g., via the roadside assistance application 334) a category of issue (e.g., "tire," or "car won't start," or the like). The category may then be used to narrow the images used for comparison or focus the shape and/or pattern recognition.

In step 506, the image may be further evaluation and/or analyzed for context. For example, the image may be analyzed to determine a make, model and/or year of the vehicle (e.g., using pre-stored information, using shape or pattern recognition to identify vehicle specifications from the received image, or the like), surroundings of the vehicle (e.g., in a ditch, in a garage, etc.) or the like, to determine whether special accommodations or equipment may be needed to provide roadside assistance. Any special considerations identified from the context evaluation may be used, along with the identified issue, to determine a service to provide to the vehicle in step 508. For instance, if analysis of the image results in a determination that the vehicle has a flat tire and the car requires a flat bed truck for towing, the service to provide may be identified as a tire change but a flat bed truck may be dispatched rather than a traditional tow truck in case additional services are needed. Various other examples of issues and services to provide may be determined.

In step 510, a roadside assistance service provider who is available to provide the identified service may be identified. The roadside assistance service provider may be identified based on real-time or near real-time availability data, availability of any special equipment, distance to determined vehicle location, and the like. In step 512, a request for roadside assistance may be transmitted (e.g., from the roadside assistance computing platform 210) to the identified roadside assistance provider.

In step 514, a determination is made as to whether the identified roadside assistance provider has accepted the request. If so, the system may generate and transmit a notification to a user in step 516. If not, the system may return to step 510 to identify another roadside assistance service provider to transmit a service request.

Figure 6:
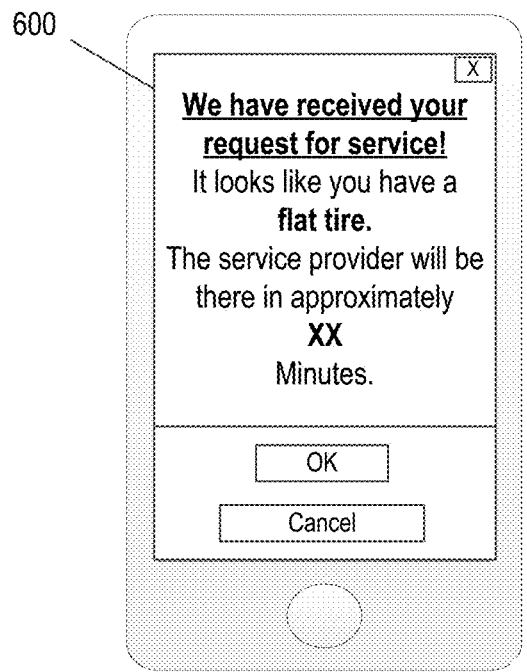
FIG. 6 illustrates one example user interface for providing a notification to a user in accordance with one or more aspects described herein.

FIG. 6 illustrates one example user interface displaying a notification to a user according to one or more aspects discussed herein. In some examples, the user interface 600 may be generated by, for instance, the roadside assistance computing platform, which may cause the interface to be displayed on, for instance, a mobile device of a user.

The interface 600 generally includes an indication that the request for service (e.g., an image of the vehicle and geotag data) has been received. The interface also includes the identified issue (e.g., "flat tire"). The interface 600 further includes an estimated wait time for the service provider.

Figure 7A:
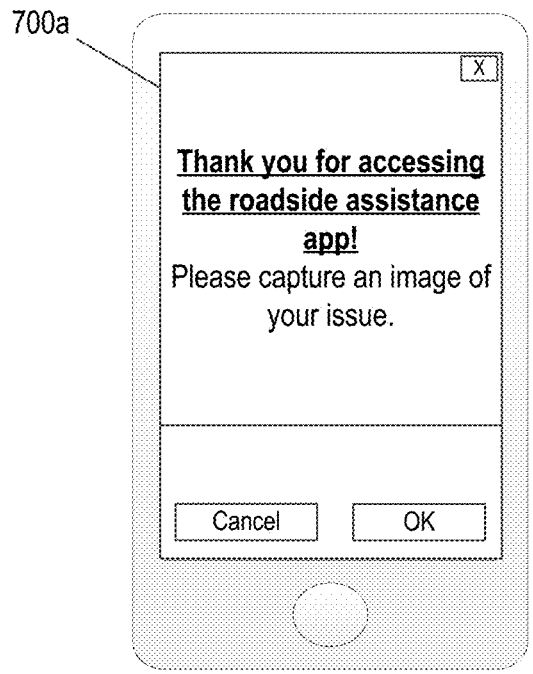
FIGS. 7A-7C illustrate example user interfaces for providing notifications to a user in accordance with one or more aspects described herein.
Figure 7B:
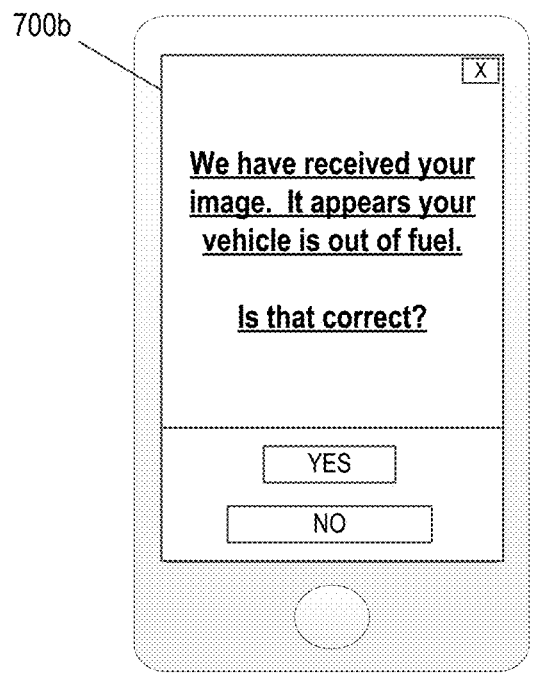
Figure 7C:
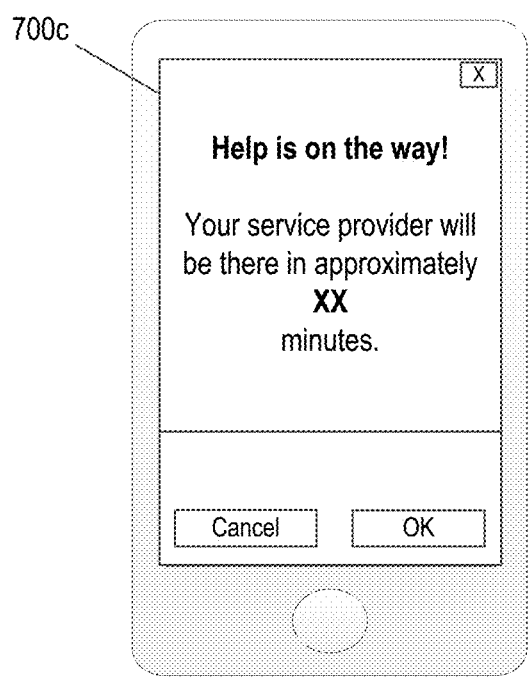

FIGS. 7A-7C illustrate additional example user interfaces for requesting roadside assistance using the arrangements discussed herein. In the examples shown in FIGS. 7A-7C, the user may have an interactive experience in which the system makes requests and the user responds. In some examples, the system may be configured to accept audio responses from the user (e.g., spoken words), in addition to or in lieu of selections made via the user interface.

FIG. 7A illustrates a first interface 700a that may be displayed upon a user accessing the roadside assistance application from his or her mobile device. The interface 700 includes instructions to capture an image of the vehicle or portion of the vehicle for which service is being requested. The user may select OK to continue to the next prompt or CANCEL to cancel the requested service.

In FIG. 7B, interface 700b is displayed indicating that the captured image and geotag information has been received. Interface 700b further indicates that a roadside assistance issue and location of the vehicle have been determined from the image. The user then has the option to indicate that yes, the information is correct, or no, the information is not correct. If not correct, the system may request one or more additional images be captured or may request identification of a location of the user.

If the information is correct, interface 700c may be displayed, as shown in FIG. 7C. Interface 700c includes an indication the request for assistance has been processed and provides an estimated wait time for the service provider.

The arrangements described herein provide systems, apparatuses, methods, and the like, for requesting roadside assistance by capturing an image of a vehicle or portion of a vehicle, geotagging data associated with the location of the vehicle, and transmitting the image and geotag data as a request for roadside assistance. In some examples, these functions may be performed via an application (e.g., executing on a mobile device). In other examples, a user may access and online website or application to perform these functions. In still other examples, the images and geotag data may be captured and transmitted for analysis via email, SMS, or the like.

As discussed herein, in some arrangements, a registration process may be performed (e.g., prior to requesting roadside assistance). For instance, a user may, in some examples, provide registration information when downloading the roadside assistance application, when obtaining an insurance policy, or the like. The registration information may include name, contact information, vehicle information, payment information, or the like. In other examples, information identifying a user may be obtained from a mobile device identifier, may be provided by the user, may be obtained from a vehicle identification number (VIN) (e.g., captured in one or more images), from a phone number from which the captured image was transmitted, or the like.

In some arrangements, a user may select (e.g., from the roadside assistance application) a category of roadside assistance issue (e.g., "tire," "battery," "fuel," or the like). Selection of a category may prompt category specific directions to provide to the user via the roadside assistance application. For instance, in some arrangements, a grid may appear on a display of the mobile device or image capture device to guide the user in capturing an image of the vehicle or portion of the vehicle.

Various aspects described herein may be embodied as a method, an apparatus, or as one or more computer-readable media storing computer-executable instructions.

Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A system, comprising:
a roadside assistance server having at least one processor and memory storing computer-readable instructions that, when executed by the at least one processor, cause the roadside assistance server to:
receive, from a mobile device, at least one image of a vehicle for which roadside assistance is being requested and metadata including embedded geotag location data associated with the at least one image;
analyze the received at least one image and embedded geotag location data to determine a location of the vehicle for which roadside assistance is being requested and a roadside assistance issue for which roadside assistance is being requested using the captured at least one image and embedded geotag location data;
identify a first roadside assistance provider available to provide a service to the vehicle associated with the determined roadside assistance issue;
transmit, to a computing device of the first roadside assistance provider, a request for roadside assistance including the service;
generate a notification including the identified first roadside assistance provider; and
transmit the generated notification to the mobile device.

2. The system of claim 1, wherein the generated notification further includes the service associated with the determined roadside assistance issue.

3. The system of claim 1, the roadside assistance server further including instructions that, when executed by the at least one processor, cause the roadside assistance server to:

receive, from the computing device of the first roadside assistance provider, denial of the request for roadside assistance;
responsive to receiving the denial, identify a second roadside assistance provider available to provide the service to the vehicle associated with the determined roadside assistance issue; and
transmit, to a computing device of the second roadside assistance provider, a request for roadside assistance including the service.

4. The system of claim 1, the roadside assistance server further including instructions that, when executed by the at least one processor, cause the roadside assistance server to:
further analyze the captured at least one image to determine a context of the image, the context including at least one of: additional vehicle information or information associated with surroundings of the vehicle in the determined location.

5. The system of claim 4, the roadside assistance server further including instructions that, when executed by the at least one processor, cause the roadside assistance server to:
based on the determined context of the image, identify special equipment to be used in providing the service to the vehicle,
wherein identifying the first roadside assistance provider includes identifying the first roadside assistance provider based on the identified special equipment to be used in providing the service to the vehicle.

6. The system of claim 4, wherein the additional vehicle information includes at least one of: a make of the vehicle, a model of the vehicle, a year of the vehicle.

7. The system of claim 4, wherein the information associated with the surroundings of the vehicle includes determining whether the vehicle is located within a structure.

8. A roadside assistance computing platform, comprising:
at least one processor;
a network interface; and
at least one memory storing computer-readable instructions that, when executed by the at least one processor, cause the roadside assistance computing platform to:
receive at least one image of a portion of a vehicle for which roadside assistance is being requested, the at least one image including geotag location data embedded in metadata associated with the at least one image;
analyze the received at least one image and embedded geotag location data to determine a location of the vehicle for which roadside assistance is being requested and a roadside assistance issue for which roadside assistance is being requested using the received at least one image and embedded geotag location data;
identify a first roadside assistance provider available to provide a service to the vehicle associated with the determined roadside assistance issue; and
transmit, to a computing device of the first roadside assistance provider, a request for roadside assistance including the service.

9. The roadside assistance computing platform of claim 8, wherein a notification is transmitted to a mobile device including the identified first roadside assistance provider and the service associated with the determined roadside assistance issue.

10. The roadside assistance computing platform of claim 8, further including instructions that, when executed by the at least one processor, cause the roadside assistance computing platform to:

receive, from the computing device of the first roadside assistance provider, denial of the request for roadside assistance;
responsive to receiving the denial, identify a second roadside assistance provider available to provide the service to the vehicle associated with the determined roadside assistance issue; and
transmit, to a computing device of the second roadside assistance provider, a request for roadside assistance including the service.

11. The roadside assistance computing platform of claim 8, further including instructions that, when executed by the at least one processor, cause the roadside assistance computing platform to:
further analyze the received at least one image to determine a context of the image, the context including at least one of: additional vehicle information or information associated with surroundings of the vehicle in the determined location.

12. The roadside assistance computing platform of claim 11, further including instructions that, when executed by the at least one processor, cause the roadside assistance computing platform to:
based on the determined context of the image, identify special equipment to be used in providing the service to the vehicle,
wherein identifying the first roadside assistance provider includes identifying the first roadside assistance provider based on the identified special equipment to be used in providing the service to the vehicle.

13. The roadside assistance computing platform of claim 11, wherein the additional vehicle information includes at least one of: a make of the vehicle, a model of the vehicle, or a year of the vehicle.

14. The roadside assistance computing platform of claim 11, wherein the information associated with the surroundings of the vehicle includes determining whether the vehicle is located within a structure.

15. A method, comprising:
receiving, by a roadside assistance server and from a mobile device, at least one image of a vehicle for which roadside assistance is being requested and metadata including embedded geotag location data associated with the at least one image;
analyzing, by the roadside assistance server, the received at least one image and embedded geotag location data to determine a location of the vehicle for which roadside assistance is being requested and a roadside assistance issue for which roadside assistance is being requested;
analyzing the captured at least one image to determine a context of the image, the context including at least one of: additional vehicle information or information associated with surroundings of the vehicle in the determined location;
based on the determined context of the image, identifying special equipment to be used in providing the service to the vehicle;
identifying, by the roadside assistance server, a first roadside assistance provider available to provide a service to the vehicle associated with the determined roadside assistance issue, the first roadside assistance provider identified based on the identified special equipment to be used in providing the service to the vehicle; and transmitting, from the roadside assistance server and to a computing device of the first roadside assistance provider, a request for roadside assistance including the service.

16. The method of claim 15, further comprising:
generating a notification including the identified first roadside assistance provider, wherein the generated notification further includes the service associated with the determined roadside assistance issue; and
transmitting, from the roadside assistance server and to the mobile device, the generated notification to the mobile device for display on the mobile device.

17. The method of claim 15, further including:
receiving, by the roadside assistance server and from the computing device of the first roadside assistance provider, denial of the request for roadside assistance;
responsive to receiving the denial, identifying a second roadside assistance provider available to provide the service to the vehicle associated with the determined roadside assistance issue; and
transmitting, to a computing device of the second roadside assistance provider, a request for roadside assistance including the service.

18. The method of claim 15, wherein the information associated with the surroundings of the vehicle includes determining whether the vehicle is located within a structure.

* * * * *